(12) United States Patent
Casimere

(10) Patent No.: US 9,591,338 B2
(45) Date of Patent: **\*Mar. 7, 2017**

(54) APPARATUS AND METHOD FOR MANAGING MEDIA CONTENT FOR MOBILE DEVICES

(71) Applicant: AT&T Intellectual Property I, LP, Atlanta, GA (US)

(72) Inventor: Kelley Casimere, Orinda, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,295

(22) Filed: Oct. 31, 2014

(65) Prior Publication Data

US 2015/0058901 A1 Feb. 26, 2015

Related U.S. Application Data

(63) Continuation of application No. 12/277,055, filed on Nov. 24, 2008, now Pat. No. 8,904,459.

(51) Int. Cl.

| | |
|---|---|
| *H04N 21/2343* | (2011.01) |
| *H04N 21/239* | (2011.01) |
| *H04N 21/258* | (2011.01) |
| *H04N 21/2747* | (2011.01) |
| *H04N 21/414* | (2011.01) |
| *H04N 21/433* | (2011.01) |
| *H04N 21/472* | (2011.01) |
| *H04W 76/00* | (2009.01) |

(52) U.S. Cl.
CPC ..... *H04N 21/2343* (2013.01); *H04N 21/2393* (2013.01); *H04N 21/25833* (2013.01); *H04N 21/2747* (2013.01); *H04N 21/41407* (2013.01); *H04N 21/4334* (2013.01); *H04N 21/47202* (2013.01); *H04W 76/002* (2013.01)

(58) Field of Classification Search
None
See application file for complete search history.

(56) References Cited

U.S. PATENT DOCUMENTS

| | | | |
|---|---|---|---|
| 6,356,309 | B1 | 3/2002 | Masaki et al. |
| 2002/0086641 | A1* | 7/2002 | Howard ................ H04L 1/0006 455/67.11 |
| 2003/0090590 | A1* | 5/2003 | Yoshizawa ......... H04N 5/44513 348/569 |
| 2005/0022242 | A1 | 1/2005 | Rosetti et al. |
| 2005/0094031 | A1* | 5/2005 | Tecot ................... G11B 27/105 348/473 |
| 2006/0026653 | A1 | 2/2006 | Matsunami |
| 2007/0074269 | A1* | 3/2007 | Hua ........................ H04N 5/76 725/151 |
| 2007/0183744 | A1 | 8/2007 | Koizumi et al. |

(Continued)

*Primary Examiner* — Omar S Parra
(74) *Attorney, Agent, or Firm* — Guntin & Gust, PLC; Matthew Tropper

(57) ABSTRACT

A system that incorporates teachings of the present disclosure may include, for example to access a broadcast of media content in response to a request to record the media content from a mobile communication device, and adjust a format of the media content based at least in part on a user profile associated with the mobile communication device where the user profile comprises device format preferences. Other embodiments are disclosed.

18 Claims, 8 Drawing Sheets

(56) References Cited

U.S. PATENT DOCUMENTS

| | | |
|---|---|---|
| 2007/0192809 A1 | 8/2007 | Lewis |
| 2008/0192858 A1* | 8/2008 | Kim ................... H04L 12/189 375/295 |
| 2008/0205852 A1 | 8/2008 | Oura et al. |
| 2008/0267591 A1 | 10/2008 | Wachtfogel et al. |
| 2008/0274768 A1 | 11/2008 | Toriumi et al. |
| 2009/0086826 A1 | 4/2009 | May et al. |
| 2009/0249424 A1 | 10/2009 | Gordon |

* cited by examiner

200

300

400

500

600

APPARATUS AND METHOD FOR MANAGING MEDIA CONTENT FOR MOBILE DEVICES

CROSS-REFERENCE TO RELATED APPLICATIONS

This application is a continuation of and claims priority to U.S. patent application Ser. No. 12/277,055, filed Nov. 24, 2008, which is incorporated herein by reference in its entirety.

FIELD OF THE DISCLOSURE

The present disclosure relates generally to communication systems and more specifically to an apparatus and method for managing media content delivery for mobile devices.

BACKGROUND

Networks are continuously expanding their abilities to distribute media content to users, as well as their capabilities for presentation of the media content. Users often have multiple devices for presenting the media content, which can include fixed devices and mobile devices. These devices can have a wide variety of adjustable features for improving the viewing experience of the users.

DETAILED DESCRIPTION

One embodiment of the present disclosure can entail a computer-readable storage medium. The storage medium can include computer instructions for accessing a user profile associated with a wireless communication device where the wireless communication device is a mobile device and where the user profile comprises user preferences provided by a user of the mobile device, receiving a request for recording media content from the wireless communication device, accessing a broadcast of the media content and recording the media content, adjusting a format of the media content based at least in part on the user profile where the format adjustment comprises providing a plurality of versions of the media content and where a first version has more error correction data than a second version, and storing the adjusted media content for playback by the wireless communication device.

Another embodiment of the present disclosure can entail a server having a controller to access a broadcast of media content in response to a request to record the media content from a mobile communication device, and adjust a format of the media content based at least in part on a user profile associated with the mobile communication device where the user profile comprises device format preferences.

Yet another embodiment of the present disclosure can entail a mobile communication device having a controller and a display device. The controller can be adapted to wirelessly transmit to a server a request for recording media content, wirelessly transmit to the server a playback request associated with the media content, wirelessly receive adjusted media content where the adjusted media content has a format adjusted based on a user profile associated with the mobile communication device where the user profile comprises format preferences, and present the adjusted media content on the display device.

Yet another embodiment of the present disclosure can entail a set top box having a controller to wirelessly receive adjusted media content from a mobile communication device where the adjusted media content is recorded based on a request from the mobile communication device and has a format adjusted based on a user profile associated with the set top box where the user profile comprises format preferences, and present the adjusted media content on a display device.

Yet another embodiment of the present disclosure can entail a method including accessing media content in response to a request to record the media content from a mobile communication device and adjusting a format of the media content based at least in part on a user profile associated with the mobile communication device.

Figure 1:
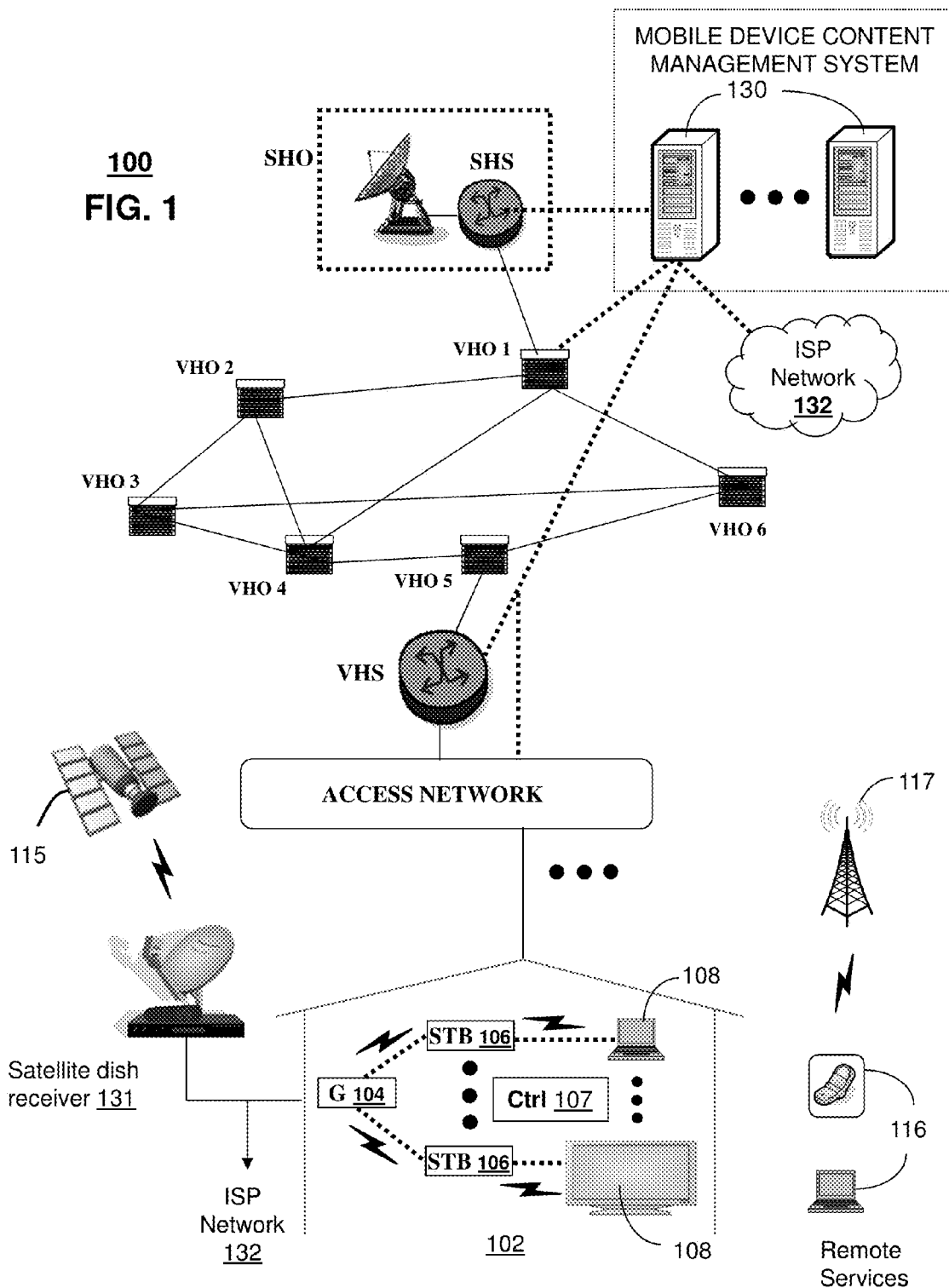
FIGS. 1-3 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.). In one embodiment, the computing devices 130 can be part of or can constitute a mobile device content management system. The system 130 can provide for recording of media content by the mobile device and/or delivery of the recorded content to the mobile device. The system 130 can adjust a format of the content prior to delivery to the mobile device to facilitate presentation of the content by the mobile device. For instance, the system 130 can consult user information, including user profiles, monitored behavior and/or inputted user preferences, and can adjust the format of the content based on the user information, including transcoding or re-formatting the data. In one embodiment, the system 130 can select a video profile of the media content from a plurality of video profiles included in an Enhanced Vestigial Sideband Modulation (E-VSB) data stream.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
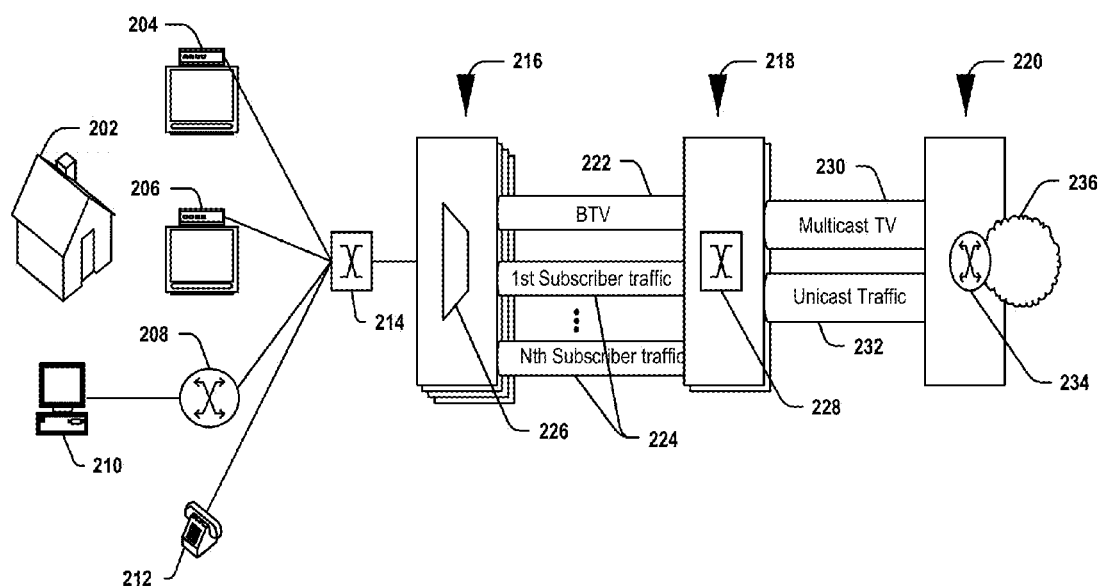

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
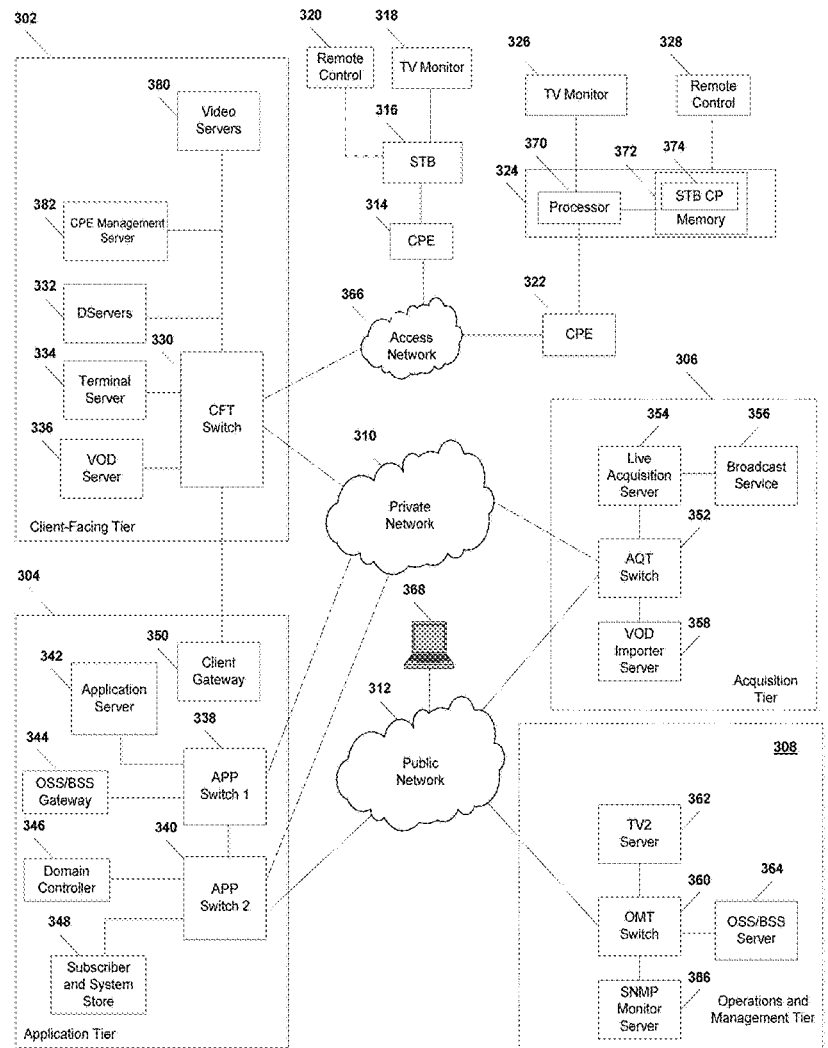

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, and modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
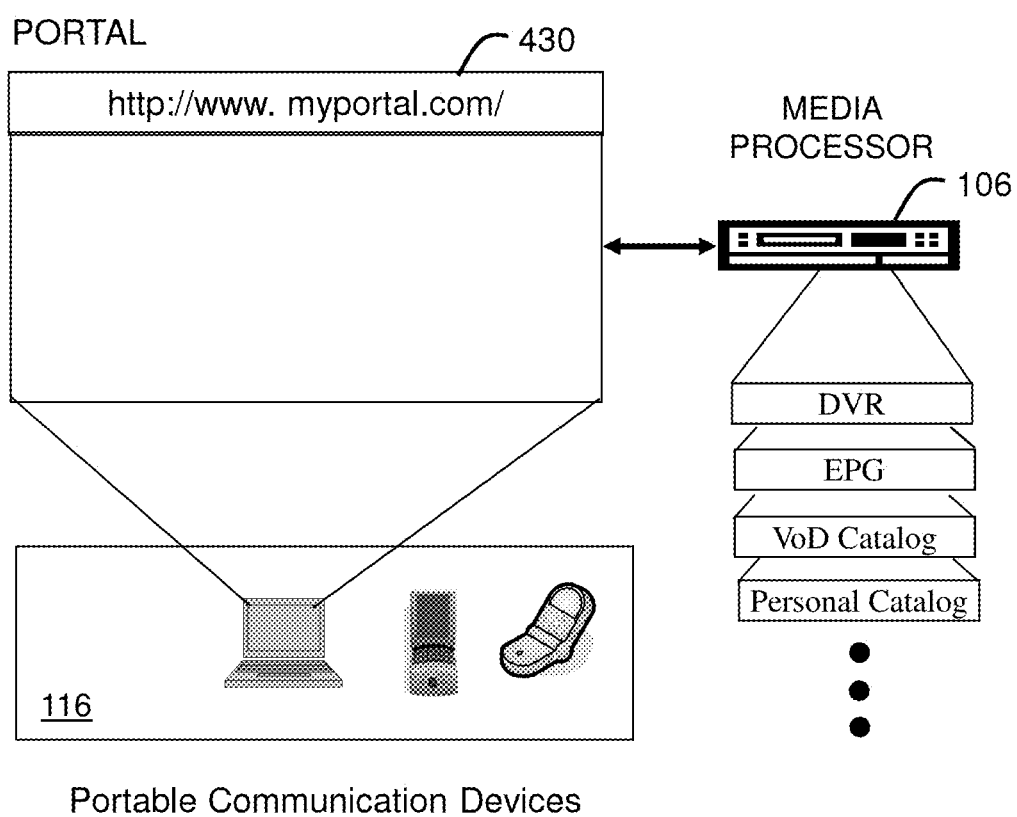
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 5:
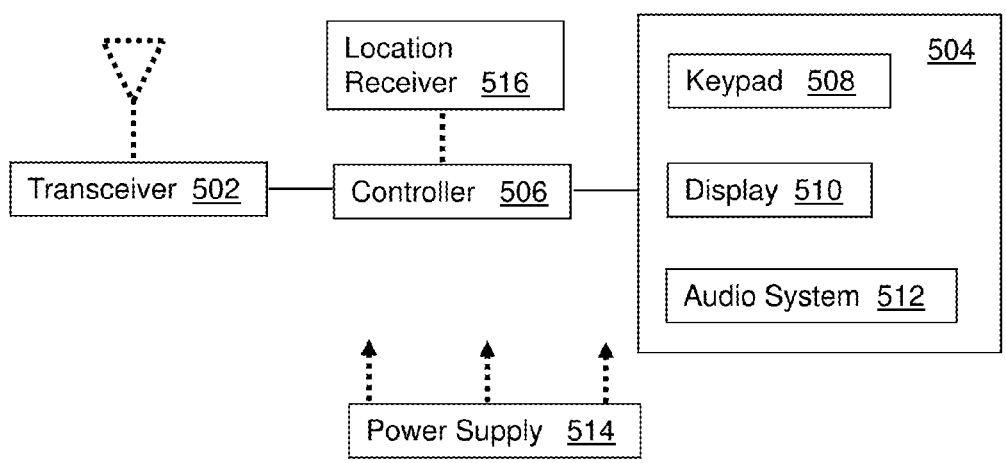
FIG. 5 depicts an illustrative embodiment of a communication device utilized in the communication systems of FIGS. 1-3.

FIG. 5 depicts an exemplary embodiment of a communication device 500. Communication device 500 can be a representative portion of any of the aforementioned communication devices of FIGS. 1-3. The communication device 504 can comprise a wireline and/or wireless transceiver 502 (herein transceiver 502), a user interface (UI) 504, a power supply 514, a location receiver 516, and a controller 506 for managing operations thereof. The transceiver 502 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1x, UMTS/HSDPA, GSM/GPRS, TDMA/EDGE, EV/DO, and next generation technologies as they arise.

The transceiver 502 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 502 can also be adapted to support IP Multimedia Subsystem (IMS) protocol for interfacing to an IMS network that can combine PSTN and VoIP communication technologies.

The UI 504 can include a depressible or touch-sensitive keypad 508 and a navigation mechanism such as a roller ball, joystick, mouse, and/or navigation disk for manipulating operations of the communication device 500. The keypad 508 can be an integral part of a housing assembly of the communication device 500 or an independent device operably coupled thereto by a tethered wiring interface (such as a USB) or a wireless interface supporting for example Bluetooth. The keypad 508 can represent a numeric dialing keypad commonly used by phones, and/or a QWERTY keypad with alphanumeric keys.

The UI 504 can further include a display 510 such as monochrome or color LCD (Liquid Crystal Display), OLED (Organic Light Emitting Diode) or other suitable display technology for conveying images to the end user of the communication device 500. In an embodiment where the display 510 is touch-sensitive, a portion or all of the keypad 508 can be presented by way of the display. The UI 504 can also include an audio system 512 that utilizes common audio technology for conveying low volume audio (such as audio heard only in the proximity of a human ear) and high volume audio (such as speakerphone for hands free operation). The audio system 512 can further include a microphone for receiving audible signals of an end user.

The power supply 514 can utilize common power management technologies such as replaceable and rechargeable batteries, supply regulation technologies, and charging system technologies for supplying energy to the components of the communication device 500 to facilitate long-range or short-range portable applications. In one embodiment, the device 500 can be a battery-operated mobile multi-mode device. The location receiver 516 utilize common location technology such as a global positioning system (GPS) receiver for identifying a location of the communication device 100, thereby facilitating common location services such as navigation. The controller 506 can utilize computing technologies such as a microprocessor and/or digital signal processor (DSP) with associated storage memory such a Flash, ROM, RAM, SRAM, DRAM or other storage technologies.

Figure 6:
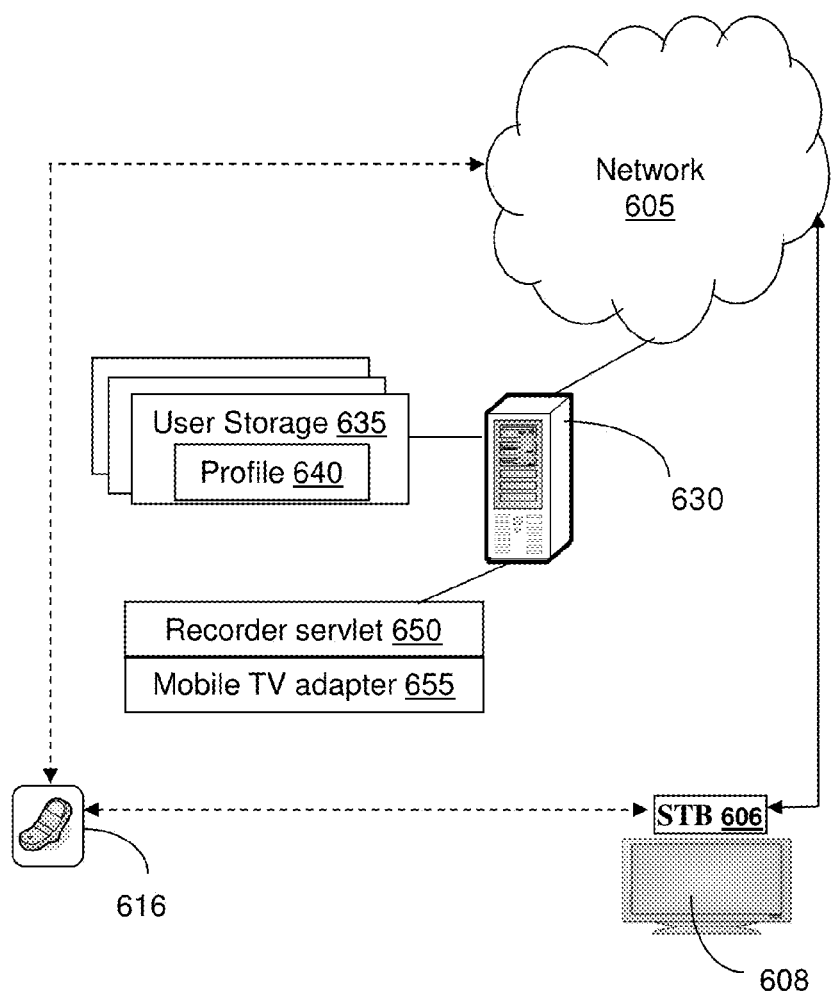
FIG. 6 depicts an illustrative embodiment of a communication system that provides media services.

FIG. 6 depicts an exemplary embodiment of a communication system 600 for delivering media content. Communication system 600 can be overlaid or operably coupled with communication systems 100-300 as another representative embodiment of said communication systems.

System 600 can include a network 605 for delivery of the media content between the provider equipment and the customer's equipment, such as an STB 606 having a display device 608, and a mobile and/or handheld communication device 616. The particular mode and/or protocol of communication for the STB 606 and/or the device 616 can vary, and can include wired and/or wireless modes and/or protocols. A number of network devices, including DSLAM's, service routers and Ethernet switches, can be utilized for transporting the signals along and from the network 605. The network 605 can utilize a number of connection structures for providing a communication link between the network devices and the STB 606 and/or the device 616, including twisted pair lines, fiber lines and/or wireless connections.

System 600 can include a server 630 having a memory, such as a database, that can be used for establishing and maintaining user storage 635. The user storage 635 can be associated with one or more users of the network 605, the STB 606 and/or the mobile device 616, including individual users and/or groups of users. The user storage 635 can store, or otherwise provide access to, user information, including device preferences, format capabilities, service plans, presence information, and so forth. In one embodiment, the user storage 635 can include media content that has been recorded pursuant to instructions from the mobile device 616 and/or some other communication device.

In one embodiment, the user storage 635 can include a user profile 640 that includes some or all of the information described above, as well as other information such as identification information associated with the user and/or the user's communication devices, and user preferences such as through monitored behavior and history of the user or user pre-selections. In another embodiment, the user profile 640 can be imported in whole or in part from other sources, such as the STB 606 or a third party network, including previous service providers. In one embodiment, the user storage 635 can be a group storage for multiple users, such as users associated with a residence or a business entity, which has a plurality of individual user profiles 640 associated with each of the users. While system 600 depicts the server 630 storing the user storage 635 in a centralized fashion, it should be understood by one of ordinary skill in the art that the present disclosure contemplates other configurations, including distributed configurations, being applied to system 600.

The server 630 can include or have access to a recorder servlet 650 for receiving requests for recording of media content from the mobile device 616. The servlet 650 can be in communication with other devices in the provider network for recording of the desired media content. In one embodiment, the server 630 can include a Mobile TV adapter 655 for adapting the format of the media content to a format deliverable to the mobile device 616. The adapter 655 can apply various encoding techniques to the media content. In one embodiment, the adapter 655 can provide for signal processing to be applied to the media content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and which provides guidelines to parameter selection and implementation scenarios; the disclosure of which is incorporated herein by reference. The E-VSB data can be received by the server 630 and/or generated by the server.

For example, media content formatted using E-VSB or other multi-profiling formats with main and lower profile versions can be retrieved by the server 630, such as through transmission over the STL path to the SHS and to the VHO. The server 630 can then provide the viewers of the mobile device 616 with all or some of the video versions during playback of the recorded media content, including one or more of the lower profile versions of the media content which have a lower resolution but higher error correction data in order to maintain the link. In one embodiment, select one(s) of the profile versions can be provided when there is a fault or potential fault determined during the playback. The fault monitoring can be performed by the server 630 or some other monitoring device, and/or can be performed by the mobile communication device 616. The fault or potential fault determination can be transmitted to the server 630 for adjusting the profiles to be transmitted. The particular error correction technique utilized for the various profiles can vary and can include FEC, such as block coding, convolution coding, concatenate coding, turbo coding and so forth.

In one embodiment, the server 630 can utilize the user information in the user storage 635 to determine the fault or potential fault, and can also utilize this user information for determining which, if any, lower profile versions of the media content are to be provided to the mobile device 616 during playback of the recorded media content. The present disclosure contemplates transmitting a single profile version of the media content to the mobile device that is selected from the plurality of profile versions in the E-VSB based on the user information associated with the mobile device 616. The present disclosure also contemplates multiple profile versions being received by the mobile device 616.

In one embodiment, the server 630 can provide settings and other user information associated with user storage 635 and user profile 640 to one or more communication devices associated with the user including mobile device 616 and STB 606, such as to facilitate sharing of the media content. In another embodiment, recorded or DVR content can be stored in the server 630 and/or the server can provide pointers to selected content which can be sent to a requesting communication device of the user by a separate DVR service. The exemplary embodiments can be performed by a single service provider or vendor, as well as through use of different service providers or vendors, including home and mobile services being different vendors where the service provider associated with the server 630 provides an agreed service coordination of benefit to the user. In one embodiment, the server 630 can be centered in the Internet, and the mobile and home service provider networks can contact the server through the Internet.

In one embodiment, recorded media content, including scheduled programming and/or rented media content such as VoD that are selected and/or recorded by the mobile device 616 can be made available to other communication devices associated with the user, such as the set top box 606. In one embodiment, the mobile user can watch the same media content that is being watched by another communication device, such as the set top box 606 at home.

In one embodiment, the mobile device 616 can be wirelessly in communication with the STB 606 through a first mode of communication, such as through a short-distance mode including WiMAX or WiFi. The mobile device 616 can then transmit the media content to the STB 606 directly without using the server 630. The mobile device 616 can be a single-mode or a multi-mode communication device.

Figure 7:
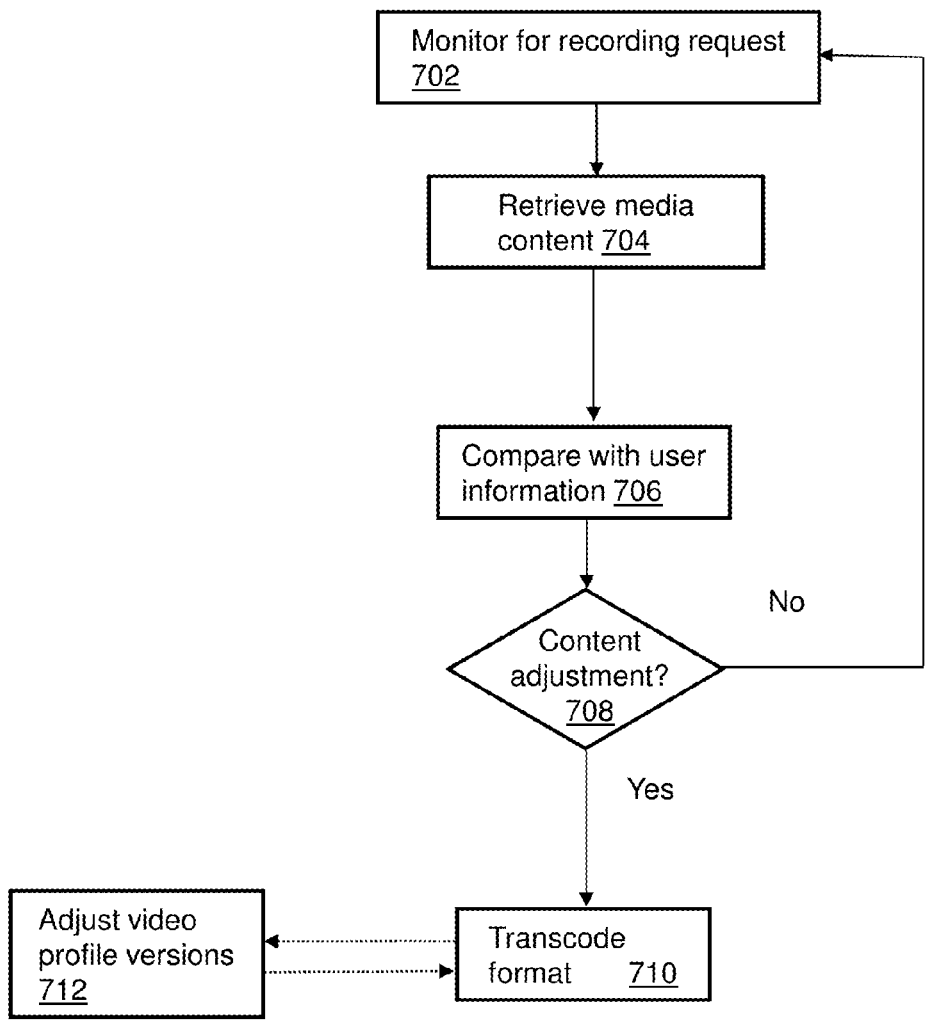
FIG. 7 depicts an illustrative embodiment of a method operating in portions of the communication systems of FIGS. 1-3 and 6.

FIG. 7 depicts an illustrative method 700 operating in portions of communication systems 100-300 and 600, including using server 630 of system 600. Method 700 can begin with step 702 in which the server 630 can monitor for a request for recording of media content by the mobile device 616. The particular monitoring technique can vary and can include the mobile device transmitting the recording request directly to the server 630. The media content to be recorded can be regularly scheduled programming VoD, and so forth. The recording request can be immediate recording or a future recording.

In step 704, the server 630 can obtain the media content that is to be recorded. The server 630 can access the media content for recording using various techniques. For example, a servlet 650 can be utilized at the server 630 so that states are preserved across multiple server transactions during the content retrieval. Non-Java dynamic Web content technologies can also be utilized for recording of the media content, such as PHP, CGI, and ASP.NET. In step 706, the server 606 can access the user information to determine if the media content to be recorded is in a desired format or is otherwise pursuant to desired parameters associated with the mobile device 616. For instance, the media content can be adjusted to a preferred format through transcoding by the server 630. The preferred format as indicated by the user information can be from a user profile, monitored behavior or the mobile device or other communication devices associated with the user, and/or inputted preferences, such as preferences provided by the user at the time of generating the recording request.

In step 708 if adjustment of the media content is not desired then the server 630 can return to monitoring for recording requests by the mobile device 616. If on the other hand, the media content is to be adjusted then the server 630, based on the user information, can perform transcoding, encoding or other format adjustment techniques to the media content in step 710. In one embodiment, the format adjustment can be based on the use of multiple profile versions of the media content as in step 712. For example, the server 630 can receive the data stream containing the main and secondary profiles, remove select profile versions, and transmit those select profile versions during playback by the mobile device 616. The profile versions can be re-multiplexed by the server 630 and stored in the user storage awaiting the request for playback. In another embodiment, the media content can be adjusted into the main and secondary profiles by the server 630 from a single version retrieved by the server. The amount of error correction and thus the resolution of the profile versions can be determined based on the user information and preferences included therein.

Upon reviewing the aforementioned embodiments, it would be evident to an artisan with ordinary skill in the art that said embodiments can be modified, reduced, or enhanced without departing from the scope and spirit of the claims described below. For example, the server 630 can record the media content and adjust its format based on user information associated with a number of communication devices of the user. The user can then playback the media content on the mobile device using a first format of the content and playback the media content on another device, such as an STB, using a second format. In one embodiment, the playback on the other devices, including the STB, can be controlled by the mobile device 616.

Server 730 also provides for selective application of adjustments to the applicable other communication devices. For instance, an increase in resolution for the mobile device 616 may not be practical during certain environmental conditions. The server 630 can selectively provide for the coordination of adjustments based on a number of factors, including preferences in the user storage 635, information provided directly by the user, and/or other data, including parameters associated with the delivery of content that may effect the content. In one embodiment, the content format adjustment can be made dependent on a current capability of the mobile device to provide the content using the particular desired format. The capability can be determined in part on conditions associated with the network 605 or delivery of the content, such as where a device is in jeopardy of losing signal lock and the coordination requires increasing resolution. In this example, the server 630 and/or other components of the system, including the receiving communication device, can determine that adjusting the setting is not desired.

Other suitable modifications can be applied to the present disclosure without departing from the scope of the claims below. Accordingly, the reader is directed to the claims section for a fuller understanding of the breadth and scope of the present disclosure.

Figure 8:
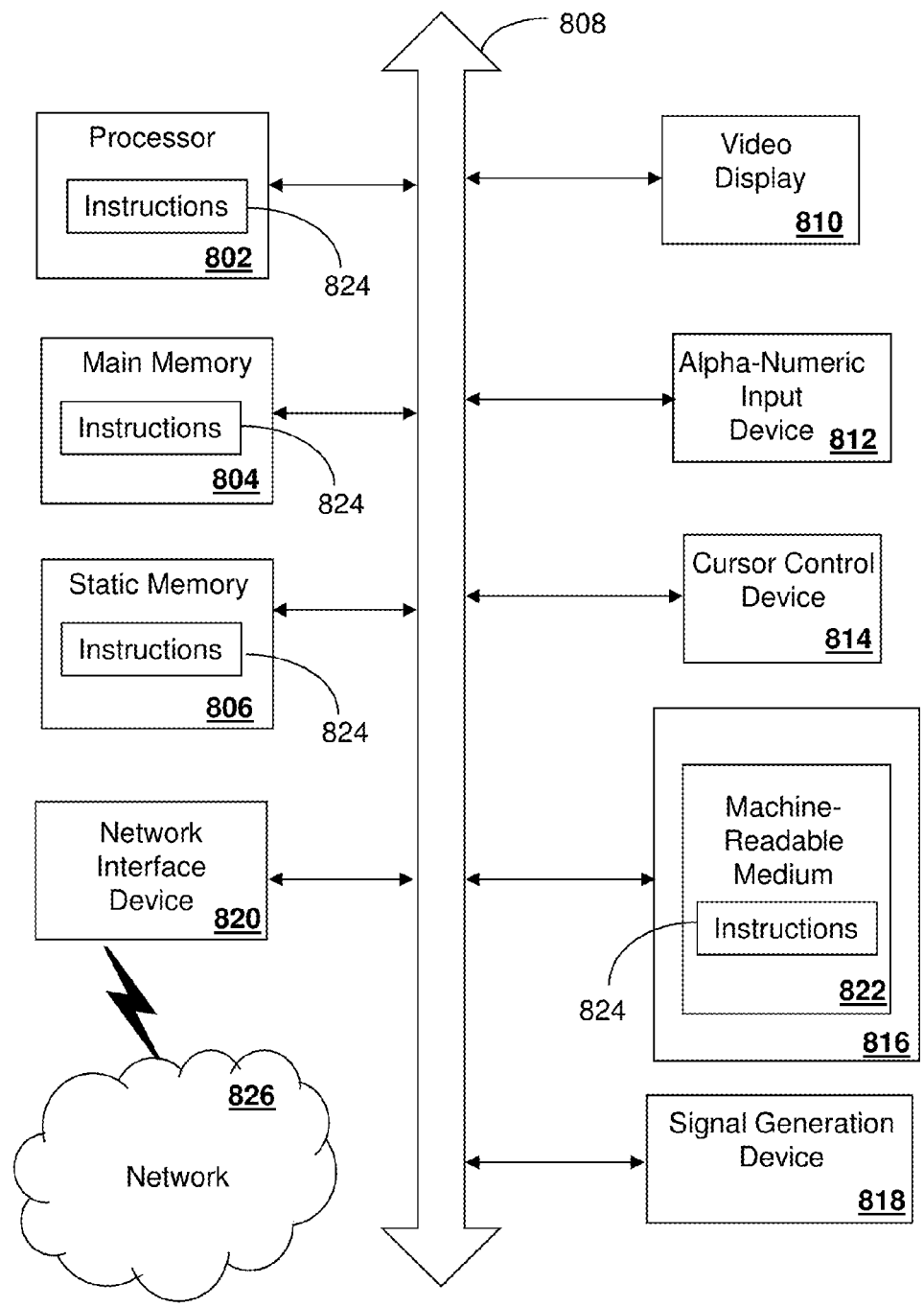
FIG. 8 is a diagrammatic representation of a machine in the form of a computer system within which a set of instructions, when executed, may cause the machine to perform any one or more of the methodologies discussed herein.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (such as a central processing unit (CPU)), a graphics processing unit (GPU, or both), a main memory 804 and a static memory 806, which communicate with each other via a bus 808. The computer system 800 may further include a video display unit 810 (such as a liquid crystal display (LCD)), a flat panel, a solid state display, or a cathode ray tube (CRT)). The computer system 800 may include an input device 812 (such as a keyboard), a cursor control device 814 (such as a mouse), a disk drive unit 816, a signal generation device 818 (such as a speaker or remote control) and a network interface device 820.

The disk drive unit 816 may include a computer-readable medium 822 on which is stored one or more sets of instructions (such as software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP, etc.) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising instructions, wherein responsive to executing the instructions, a processing system comprising a processor performs operations comprising:
   accessing a user profile associated with a mobile communication device, the user profile comprising user preferences provided by a user of the mobile communication device;
   receiving a request for recording media content from the mobile communication device;
   accessing a broadcast of the media content and recording the media content;
   adjusting a format of the media content as adjusted media content based on a current capability of the mobile communication device to provide the content using a desired format, wherein the adjusting the format comprises obtaining a plurality of versions of the media content, wherein the plurality of versions of the media content comprises a first version and a second version, and wherein the first version has more error correction data than the second version;
   monitoring for a fault associated with delivery of the media content to the mobile communication device;
   providing the first version of the media content to the mobile communication device responsive to no fault being found;
   providing the second version of the media content to the mobile communication device responsive to a fault being found; and
   storing the adjusted media content for playback by the mobile communication device.

2. The non-transitory, storage medium of claim 1, wherein the operations further comprise transmitting the adjusted media content to the mobile communication device in response to a request for playback received from the mobile communication device.

3. The non-transitory, storage medium of claim 1, wherein the operations further comprise monitoring behavior associated with the mobile communication device and storing information associated with the monitored behavior in the user profile.

4. The non-transitory, storage medium of claim 1, wherein the second version has a lower resolution than a resolution of the first version.

5. The non-transitory, storage medium of claim 4, wherein the operations further comprise monitoring for a fault in the playback by the mobile communication device.

6. The non-transitory, storage medium of claim 5, wherein the operations further comprise presenting an option between the first version and the second version at the mobile communication device when the fault in the playback by the mobile communication device is detected.

7. The non-transitory, storage medium of claim 4, wherein the operations further comprise transmitting the plurality of versions of the media content to the mobile communication device.

8. A server, comprising:
a processing system including a processor; and
a memory that stores executable instructions that, when executed by the processing system, facilitate performance of operations, comprising:
accessing a broadcast of media content in response to a request to record the media content from a mobile communication device;
adjusting a format of the media content based on a current capability of the mobile communication device to provide the content using a selected format;
adjusting the format of the media content into a plurality of versions of the media content, wherein a first version has less error correction data than a second version;
selecting one of the first version and the second version as a selected version based at least in part on a potential undesired condition associated with presentation of the media content by the mobile communication device; and
transmitting the selected version to the mobile communication device.

9. The server of claim 8, wherein the operations further comprise wirelessly transmitting the adjusted media content to the mobile communication device in response to a request for playback received from the mobile communication device.

10. The server of claim 8, wherein the operations further comprise transmitting the adjusted media content to a second communication device associated with a user of the mobile communication device.

11. The server of claim 10, wherein the second communication device comprises a set top box.

12. The server of claim 8, wherein the operations further comprise monitoring behavior associated with the mobile communication device and storing information associated with the monitored behavior in a user profile.

13. The server of claim 8, wherein the operations further comprise transmitting the plurality of versions of the media content to the mobile communication device.

14. A mobile communication device, comprising:
a display device;
a processing system comprising a processor; and
a memory that stores executable instructions that, when executed by the processing system, facilitate performance of operations, comprising:
wirelessly transmitting to a server a request for recording media content;
wirelessly transmitting to the server a playback request associated with the media content;
wirelessly receiving adjusted media content, wherein the adjusted media content has a format adjusted based on a current capability of the mobile device to provide the content using a selected format, and wherein the adjusted media content comprises a first version of the media content and a second version of the media content, and wherein the first version has more error correction data than the second version; and
presenting the adjusted media content on the display device.

15. The device of claim 14, wherein the first version has a lower resolution than a resolution of the second version, and wherein the second version has higher error correction data than error correction data of the first version.

16. The device of claim 15, wherein the operations further comprise:
receiving a fault detection message to the server; and
receiving at third version of the media content in response to the fault detection message, wherein the third version has more error correction data than the first version and the second version.

17. The device of claim 16, wherein the operations further comprise transmitting the adjusted media content to a set top box associated with an account of the mobile communications device.

18. The device of claim 14, wherein the operations further comprise adjusting the format of the media content into a plurality of versions of the media content, wherein each of the plurality of versions of the media content have differing levels of error correction.

* * * * *